US010923071B2

(12) United States Patent
Chen

(10) Patent No.: US 10,923,071 B2
(45) Date of Patent: Feb. 16, 2021

(54) APPARATUS, SYSTEMS, AND METHODS FOR DISPLAYING IMAGES IN ROTATED DISPLAY REGIONS OF DISPLAY SCREENS

(71) Applicant: Facebook Technologies, LLC, Menlo Park, CA (US)

(72) Inventor: Dong Chen, Foster City, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/664,645

(22) Filed: Oct. 25, 2019

(65) Prior Publication Data
US 2020/0058262 A1 Feb. 20, 2020

Related U.S. Application Data

(63) Continuation of application No. 15/954,084, filed on Apr. 16, 2018, now Pat. No. 10,535,319.

(60) Provisional application No. 62/634,780, filed on Feb. 23, 2018.

(51) Int. Cl.
G09G 5/00 (2006.01)
G09G 3/20 (2006.01)
G09G 3/36 (2006.01)
F21V 8/00 (2006.01)

(52) U.S. Cl.
CPC ........... G09G 5/003 (2013.01); G02B 6/0043 (2013.01); G09G 3/2092 (2013.01); G09G 3/3625 (2013.01); G09G 2300/0426 (2013.01); G09G 2310/0281 (2013.01)

(58) Field of Classification Search
USPC ........................................ 345/102
See application file for complete search history.

(56) References Cited

U.S. PATENT DOCUMENTS

| 10,535,319 | B2* | 1/2020 | Chen | G09G 3/3625 |
| 2002/0036597 | A1* | 3/2002 | Chigira | G02B 27/017 345/8 |
| 2008/0018557 | A1* | 1/2008 | Maeda | G02F 1/167 345/55 |
| 2011/0214082 | A1 | 9/2011 | Osterhout et al. | |
| 2014/0002491 | A1 | 1/2014 | Lamb et al. | |
| 2014/0266990 | A1* | 9/2014 | Makino | G02B 27/0172 345/8 |
| 2015/0309312 | A1* | 10/2015 | Alton | G06T 19/006 345/592 |

(Continued)

Primary Examiner — Chineyere D Wills-Burns
(74) Attorney, Agent, or Firm — FisherBroyles, LLP

(57) ABSTRACT

The disclosed display device may include a display screen having (1) a front surface and (2) a pair of display regions that emit image light from the front surface, the pair of display regions separated from each other by a non-display region in a longitudinal direction of the display screen, each of the pair of display regions including a plurality of pixels arranged in a plurality of pixel rows and a plurality of pixel columns, the plurality of pixel rows and the plurality of pixel columns each extending obliquely relative to a peripheral edge of the front surface. The display device may also include a display driver circuit for driving the plurality of pixels of both of the pair of display regions, the display driver circuit disposed apart from the pair of display regions in a lateral direction of the display screen. Various other methods, systems, and devices are also disclosed.

19 Claims, 10 Drawing Sheets

(56) References Cited

U.S. PATENT DOCUMENTS

| | | | |
|---|---|---|---|
| 2015/0319412 A1* | 11/2015 | Koshiba | H01L 27/14621 |
| | | | 348/246 |
| 2017/0270841 A1* | 9/2017 | An | G09G 3/3275 |
| 2017/0280134 A1 | 9/2017 | Woods | |
| 2018/0136471 A1 | 5/2018 | Miller et al. | |
| 2018/0247392 A1* | 8/2018 | Takizawa | G02B 27/017 |
| 2018/0307044 A1* | 10/2018 | Oh | G02B 27/0176 |
| 2018/0336825 A1* | 11/2018 | An | G09G 3/3291 |
| 2018/0376082 A1 | 12/2018 | Liu | |
| 2019/0113755 A1* | 4/2019 | Komatsu | H01N 13/344 |
| 2019/0156466 A1* | 5/2019 | Cho | G06F 3/01 |
| 2020/0012101 A1* | 1/2020 | Yuki | G02B 27/0101 |

* cited by examiner

APPARATUS, SYSTEMS, AND METHODS FOR DISPLAYING IMAGES IN ROTATED DISPLAY REGIONS OF DISPLAY SCREENS

CROSS-REFERENCE TO RELATED APPLICATIONS

This application is a continuation of and claims priority to U.S. patent application Ser. No. 15/954,084, filed 16 Apr. 2018, and titled APPARATUS, SYSTEMS, AND METHODS FOR DISPLAYING IMAGES IN ROTATED DISPLAY REGIONS OF DISPLAY SCREENS, which claims the benefit of and priority to U.S. Provisional Patent Application No. 62/634,780, filed 23 Feb. 2018, and titled APPARATUS, SYSTEMS, AND METHODS FOR DISPLAYING IMAGES IN ROTATED DISPLAY REGIONS OF DISPLAY SCREENS, the disclosures of each of which are incorporated, in their entirety, by this reference.

BACKGROUND

Artificial reality devices, such as virtual reality headsets, are widely gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation—for example, governments may use them for military training simulations, doctors may use them to practice surgery, and engineers may use them as visualization aids. Artificial reality systems are also increasingly recognized for their utility in facilitating inter-personal interactions between individuals in a variety of contexts.

However, virtual reality headsets are often bulky in size. Reducing the display screen size to accommodate smaller headsets may present difficulties due to the rectangular shape of commonly used display screens, which often do not fit within headset housings having smaller form factors. Additionally, reductions in display screen size may result in various display driving and uniformity issues that may result in sub-optimal experiences for headset users.

SUMMARY

As will be described in greater detail below, the instant disclosure describes apparatus, systems, and methods for displaying images in rotated display regions of display screens. In at least one embodiment, a display device may include a display screen having (1) a front surface and (2) at least one display region that emits image light from the front surface, the at least one display region including a plurality of pixels arranged in a plurality of pixel rows and a plurality of pixel columns, the plurality of pixel rows and the plurality of pixel columns each extending obliquely relative to a peripheral edge of the front surface. The display device may also include a display driver circuit for driving the plurality of pixels of the at least one display region, wherein the display driver circuit is disposed adjacent to the peripheral edge of the front surface.

In some embodiments, the at least one display region may include a plurality of scanning lines extending parallel to the plurality of pixel rows and a plurality of data lines extending parallel to the plurality of pixel columns. The display driver circuit may be electrically coupled to the plurality of scanning lines and the plurality of data lines of the at least one display region. In some example, the plurality of pixel rows of the at least one display region may each extend in a row direction having an angle of approximately 45° with respect to the peripheral edge of the front surface and the plurality of pixel columns of the at least one display region may each extend in a column direction having an angle of approximately 45° with respect to the peripheral edge of the front surface.

According to at least one embodiment, a perimeter of the plurality of pixels in the at least one display region may have a nonrectangular shape. In this example, the perimeter of the plurality of pixels in the at least one display region may have an octagonal shape. At least one side of the perimeter of the plurality of pixels in the at least one display region may intersect multiple scanning lines and multiple data lines of the at least one display region.

According to some embodiments, the at least one display region may include a pair of display regions disposed apart from each other in a longitudinal direction of the display screen and the display driver circuit may be disposed apart from each display region of the pair of display regions in a lateral direction of the display screen. In this example, (1) a first display region of the pair of display regions may include a first set of scanning lines and (2) a second display region of the pair of display regions a second set of scanning lines. The first set of scanning lines may each extend in a first scanning line direction and the second set of scanning lines may each extend in a second scanning line direction that is different than the first scanning line direction. The display screen may have a nonrectangular periphery surrounding the front surface.

In at least one embodiment, the display screen may also include a backlight unit having (1) a light source and (2) a light guide plate having a pattern of microstructures for diffusing light from the light source. A density of the microstructures may be lower in a non-display region of the display screen. In some examples, the microstructures of the pattern of microstructures may not be formed in the non-display region of the display screen. The pattern of microstructures may, for example, include a plurality of diffuser dots. The non-display region of the display screen may be located between the pair of display regions. In at least one example, the light source may be disposed adjacent to a peripheral side of the display screen adjoining the peripheral edge of the front surface. A corresponding head-mounted-display device may include a display device and a display housing surrounding the display device.

According to some embodiments, a display device may include a display screen having (1) a front surface, (2) a pair of display regions that emit image light from the front surface, and (3) a backlight unit that includes a light source and a light guide plate having a pattern of microstructures for diffusing light from the light source. A density of the microstructures may be lower in a non-display region of the display screen located between the pair of display regions.

A corresponding method may include (1) receiving initial image data for displaying an image on a display device in an initial orientation, (2) modifying the initial image data to generate modified image data for displaying the image on the display device in a rotated orientation that is rotated by a selected angle of rotation relative to the initial orientation, and (3) driving the display device based on the modified image data. In this example, the display device may include (1) a front surface and (2) at least one display region that emits, from the front surface, image light forming the image. The at least one display region may include a plurality of pixels arranged in a plurality of pixel rows and a plurality of pixel columns, and at least one of the plurality of pixel rows or the plurality of pixel columns may extend at an extension angle relative to a peripheral edge of the front surface. The extension angle may be equivalent to the selected angle of rotation.

In at least one embodiment, the at least one display region may include a first display region and a second display region. In this example, receiving the initial image data may further include (1) receiving a first set of initial image data for displaying a first image in the first display region in a first initial orientation and (2) receiving a second set of initial image data for displaying a second image in the second display region in a second initial orientation. Additionally, modifying the initial image data may further include (1) modifying the first set of initial image data to generate a first set of modified image data for displaying the first image in the first display region in a first rotated orientation that is rotated by a first selected angle of rotation relative to the first initial orientation and (2) modifying the second set of initial image data to generate a second set of modified image data for displaying the second image in the second display region in a second rotated orientation that is rotated by a second selected angle of rotation relative to the second initial orientation. In some embodiments, the second selected angle of rotation may be different than the first selected angle of rotation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
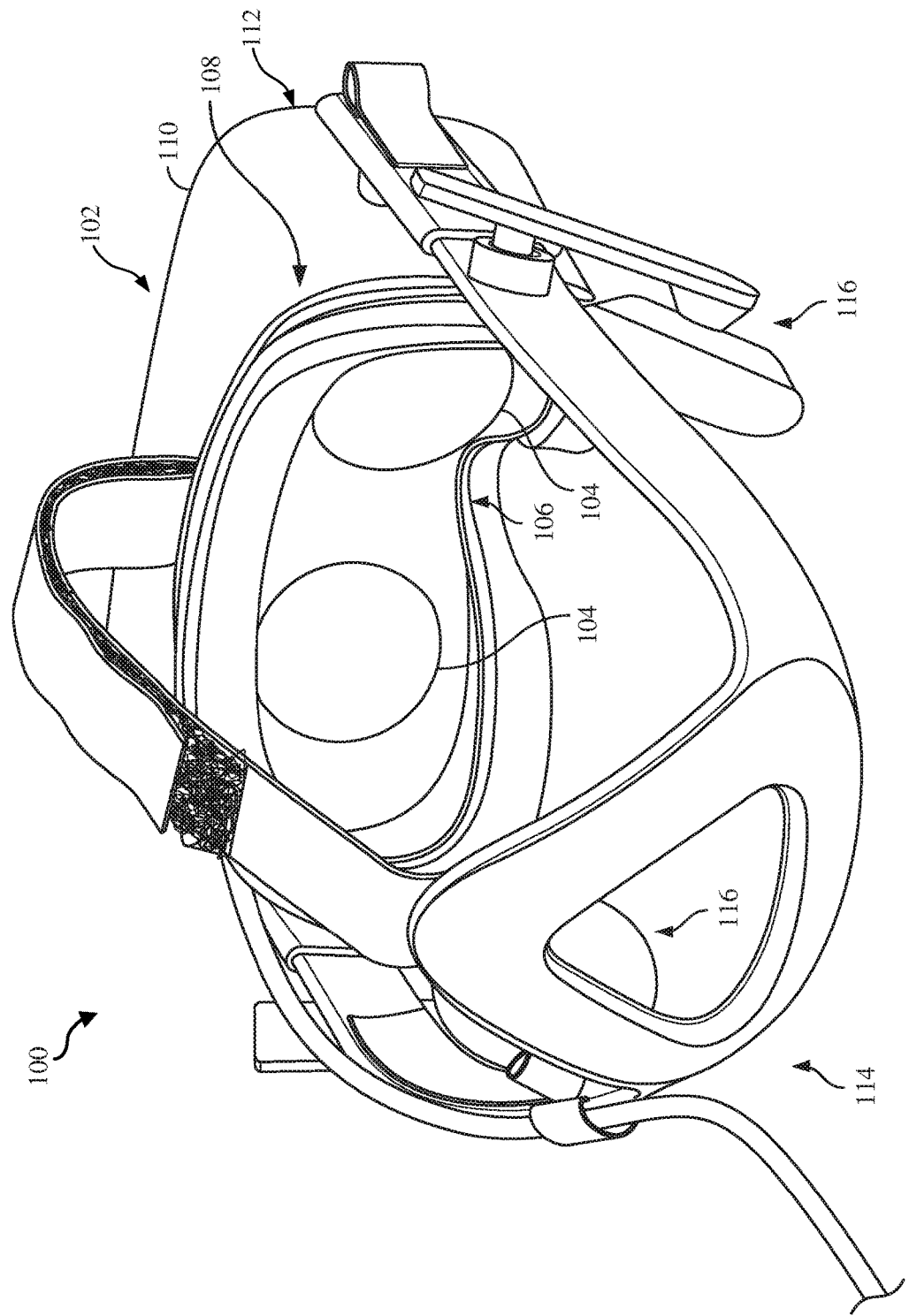
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure describes apparatus, systems, and methods for displaying images in rotated display regions of display screens. In at least one embodiment, a display device may include a display screen having (1) a front surface and (2) at least one display region that emits image light from the front surface, the at least one display region including a plurality of pixels arranged in a plurality of pixel rows and a plurality of pixel columns, the plurality of pixel rows and the plurality of pixel columns each extending obliquely relative to a peripheral edge of the front surface. The display device may also include a display driver circuit for driving the plurality of pixels of the at least one display region, with the display driver circuit being disposed adjacent to the peripheral edge of the front surface. In some examples, the display device may also include a backlight unit having light guide plates that include non-display regions that include regions devoid of light-diffusing microstructures.

Figure 2A:
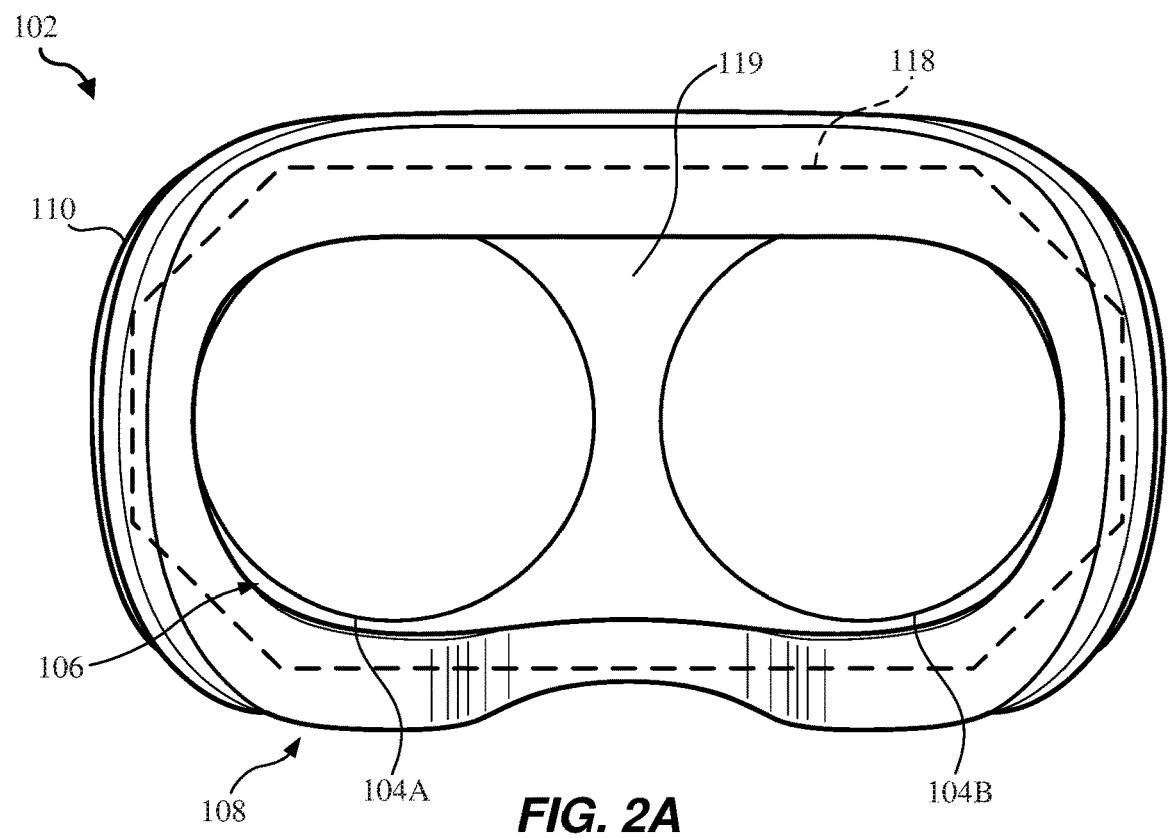
FIG. 2A is a front view of an exemplary head-mounted-display device in accordance with some embodiments.
Figure 2B:
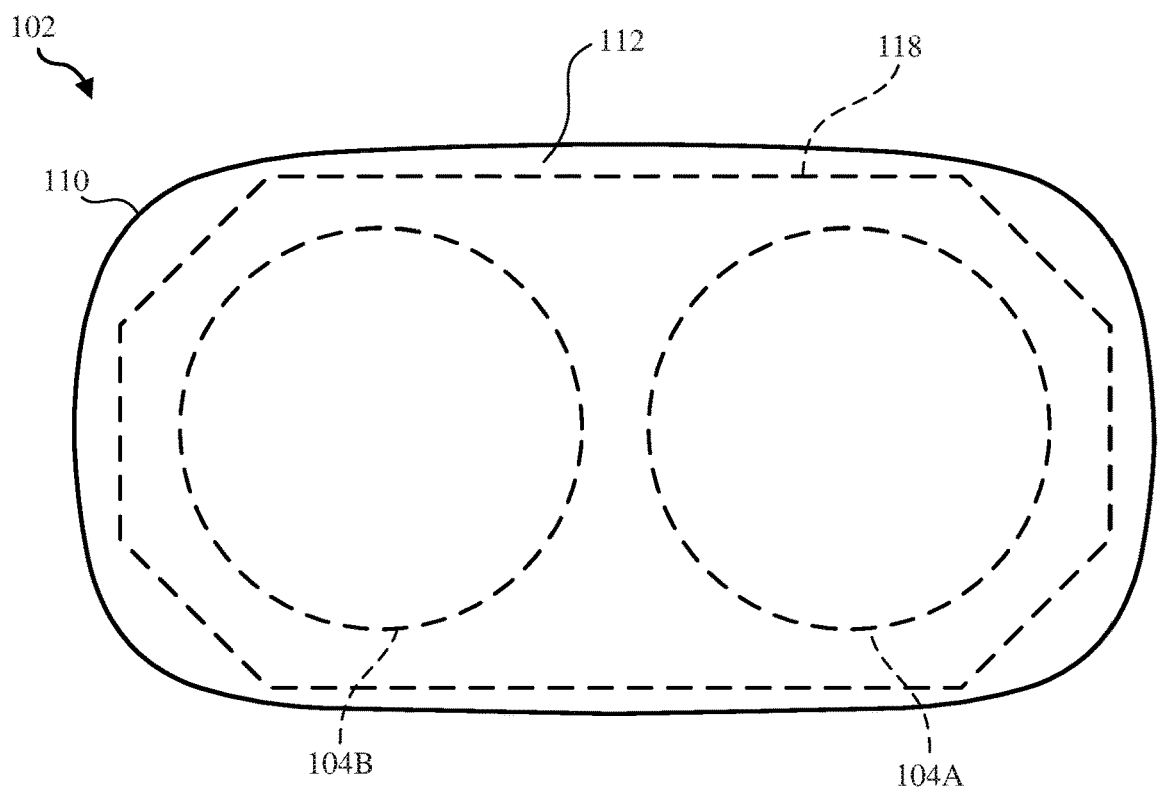
FIG. 2B is a rear view of the head-mounted-display device of FIG. 2A in accordance with some embodiments.
Figure 3:
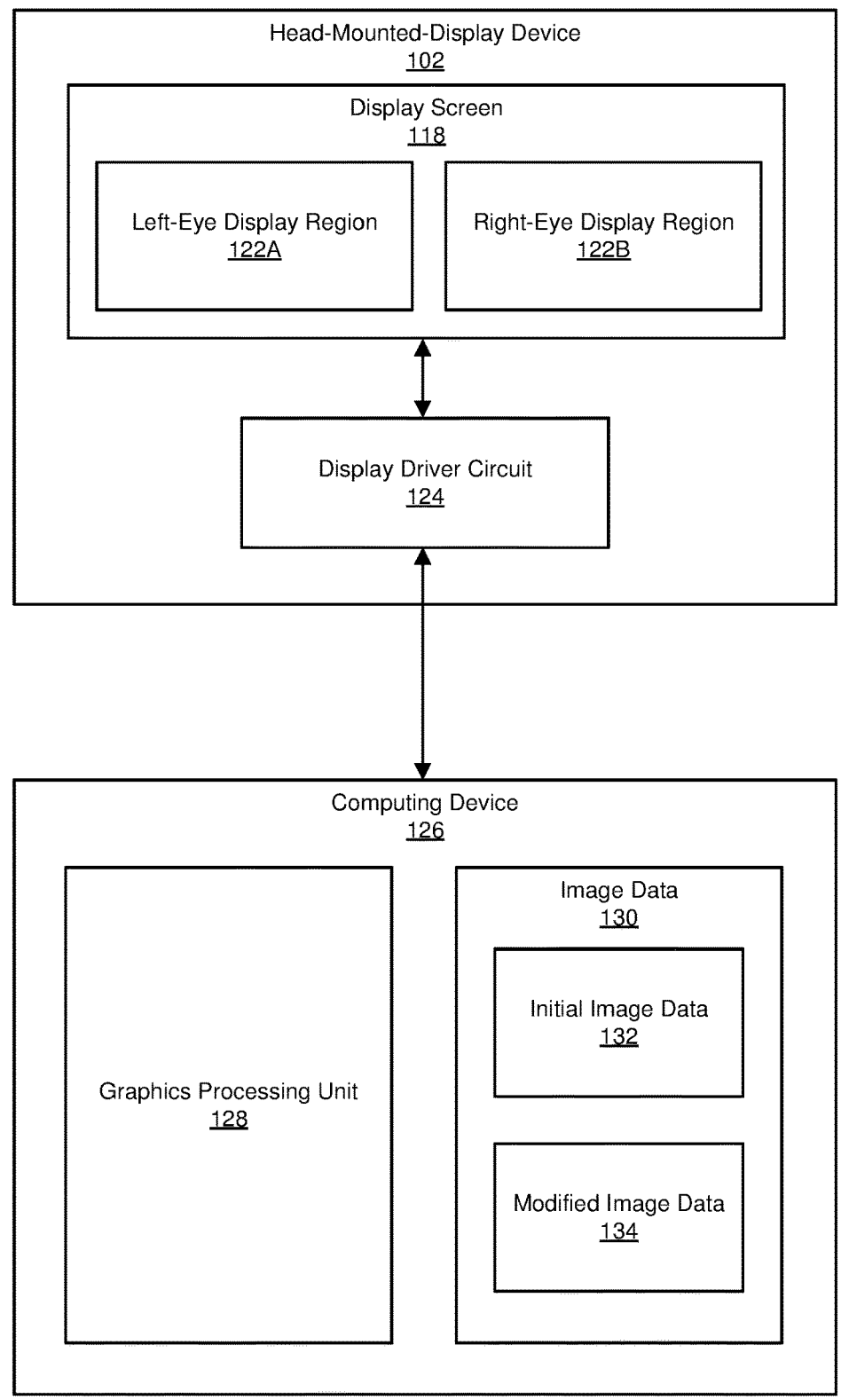
FIG. 3 is a block diagram of an exemplary display system in accordance with some embodiments.

The following will provide, with reference to FIGS. 1-3, examples of display systems and devices. In addition, the discussion corresponding to FIGS. 4A-6A will provide examples of display screens used in various display systems and devices. The discussion corresponding to FIGS. 7-8B will provide examples of backlight units included in display screens. Finally, the discussion corresponding to FIG. 9 will provide examples of methods for displaying images in rotated display regions of display screens.

FIG. 1 is a perspective view of a head-mounted-display system 100 in accordance with some embodiments. In some embodiments, head-mounted-display system 100 may include a head-mounted-display device 102, a facial-interface system 108, a strap assembly 114, and audio subsystems 116. A head-mounted-display device may include any type or form of display device or system that is worn on or about a user's head and displays visual content to the user. Head-mounted-display devices may display content in any suitable manner, including via a screen (e.g., an LCD or LED screen), a projector, a cathode ray tube, an optical mixer, etc. Head-mounted-display devices may display content in one or more of various media formats. For example, a head-mounted-display device may display video, photos, and/or computer-generated imagery (CGI). Head-mounted-display device 102 may include a display housing 110 surrounding various components of head-mounted-display device 102, including lenses 104 and various electronic components, including display components as described herein. Display housing 110 may include a housing back surface 112 and side surfaces surrounding the internal components, and an opening surrounding a viewing region 106 at a front side of display housing 110.

Head-mounted-display devices may provide diverse and distinctive user experiences. Some head-mounted-display devices may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted-display devices may be configured to be mounted to a user's head in a number of ways. Some head-mounted-display devices may be incorporated into glasses or visors. Other head-mounted-display devices may be incorporated into helmets, hats, or other headwear.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, audio subsystems 116 may be integrated with head-mounted-display device 102 and may provide audio signals to the user's ears in conjunction with or separate from displayed content. Head-mounted-display system 100 may, for example, have two audio subsystems 116 located on the left and right sides of head-mounted-display system 100 to provide audio signals to the user's left and right ears, as shown in FIG. 1.

Strap assembly 114 may be used for adjustably mounting head-mounted-display device 102 on the user's head. As shown in FIG. 1, strap assembly 114 may include lower straps and/or an upper strap that are coupled to head-mounted-display device 102 to adjustably conform to the top and/or sides of the user's head when the user is wearing head-mounted-display system 100. In some embodiments, strap assembly 114 may include a back piece coupled with the upper strap and lower straps to rest against the back of the user's head (e.g., around the user's occipital lobe). In at least one embodiment, the back piece may include an opening that is dimensioned and positioned to securely fit around a back portion (e.g., a portion of the user's occipital lobe) of the user's head.

In some embodiments, facial-interface system 108 may be configured to comfortably rest against a region of the user's face, including a region surrounding the user's eyes, when head-mounted-display system 100 is worn by the user. In these embodiments, facial-interface system 108 may include an interface cushion that is configured to rest against portions of the user's face (e.g., at least a portion of the user's nasal, cheek, temple, and/or forehead facial regions). Facial-interface system 108 may surround viewing region 106, which includes the user's field of vision, allowing the user to look through lenses 104 of head-mounted-display device 102 without interference from outside light while the user is wearing head-mounted-display system 100.

FIGS. 2A and 2B respectively show front and rear views of head-mounted-display device 102. Head-mounted-display device 102 may include a display screen 118 disposed within display housing 110. For example, as shown in FIGS. 2A and 2B, display screen 118 may disposed within display housing 110 so as to overlap left-eye lens 104A and right-eye lens 104B such that images produced by a display region of display screen 118 are visible to a user through left- and right-eye lenses 104A and 104B. In some embodiments, distinct portions of display screen 118 may be visible to each of the user's eyes, with the screen content visible to each eye being separated by a dividing region (e.g., separate eye cups, a central partition, etc.) extending between display screen 118 and each of left- and right-eye lenses 104A and 104B. Such a configuration may enable distinct images to be presented by display screen 118 to each of the user's eyes, allowing for 3-dimensional images to be perceived by the user. While one display screen 118 is illustrated in FIGS. 2A and 2B, in some embodiments, head-mounted-display devices may include multiple LCD screens. For example, a head-mounted-display device may include two LCD screens, with a separate LCD screen being visible to each of a user's left and right eyes.

As shown in FIG. 2A, head-mounted-display device 102 may also include a light-blocking layer 119 surrounding left- and right-eye lenses 104A and 104B. Light-blocking layer 119 may, for example, extend between left- and right-eye lenses 104A and 104B and surrounding portions of display housing 110. Light-blocking layer 119 may include, for example, a light-absorbing material (e.g., a dark polymeric and/or fabric material) that masks internal components of head-mounted-display device 102 and that prevents any outside light incidentally entering viewing region 106 (e.g., through a gap between the user's face and facial-interface system 108) from being reflected within viewing region 106. Display housing 110 may include a rigid material, such as a rigid plastic, that supports and protects internal components, such as display screen 118 and other electronics. At least a portion of display housing 110, such as a portion of display housing 110 surrounding viewing region 106, may include a light-absorbing material that prevents passage of external light and prevents reflection of light incidentally entering viewing region 106. Blocking external light and/or preventing reflection of light in viewing region 106 of head-mounted-display device 102 may greatly enhance a user's immersive viewing experience by ensuring that nearly all light visible to the user is image light emitted from display screen 118.

FIG. 3 shows an exemplary display system 120 in accordance with some embodiments. As shown in this FIG. 3, display system 120 may include head-mounted-display device 102 communicatively coupled to a computing device 126. Additionally or alternatively, display system 120 may include any other suitable type of display device without limitation (e.g., a television, a computer monitor, a laptop monitor, a tablet device, a portable device, such as a a smartphone or cellular telephone, a wrist-watch device, a pendant device or other wearable or miniature device, a media player, a camera viewfinder, a gaming device, a navigation device, and/or any other type of device including an electronic display screen, without limitation). At least a portion of computing device 126 may be incorporated within a head-mounted-display system (e.g., head-mounted-display system 100 of FIG. 1). Additionally or alternatively, at least a portion of computing device 126 may represent one or more external computing devices that are in communication with head-mounted-display device 102, such as, for example, a gaming and/or multimedia console or device, a desktop, a laptop, a tablet, a cellular phone, a smart phone, a wearable device, an embedded system, an internet router, another head-mounted-display device, a hand-held controller, etc.

Head-mounted-display device 102 may include display screen 118 having a left-eye display region 122A and a right-eye display region 122B as shown in FIG. 3. Left-eye display region 122A and right-eye display region 122B may include portions of display screen 118 that are visible to a user wearing head-mounted-display device 102 via left-eye lens 104A and right-eye lens 104B, respectively. As will be described in greater detail below, each of left-eye display region 122A and right-eye display region 122B may include a plurality of pixels and subpixels that form visible images according to any suitable display technology. For example, display screen 118 may be any suitable type of LCD screen, such as a backlit LCD screen that modulates emitted light through an active matrix liquid crystal pixel array. In some embodiments, display system 120 may include any other suitable type of display screen, such as, for example, an organic light-emitting diode (LED) screen (e.g., an active-matrix OLED screen), a plasma screen, an electrophoretic display screen, an electrowetting display screen, a cathode ray screen, and/or any other suitable image display screen. Light may be emitted from a display surface of display screen 118 such that the images are visible to the user in each of left-eye display region 122A and right-eye display region 122B. In some examples, images may be produced by driving subpixels at different currents and/or voltages such that different amounts of light are emitted from each of the subpixels. For example, selected voltages may be applied to subpixel regions of a liquid crystal layer to allow passage of various amounts of light. A wide variety visible colors may be produced by combining different amounts of light passed through subpixel color regions (e.g., red, green, and/or blue color regions) of a color filter array layer such that a user perceives colors corresponding to the combinations of the subpixel colors.

According to at least one embodiment, as shown in FIG. 3, head-mounted-display device 102 of display system 120 may include a display driver circuit 124 for driving subpixels of left-eye display region 122A and right-eye display region 122B of display screen 118. Display driver circuit 124 may include any suitable circuitry for driving display screen 118. For example, display driver circuit 124 may include at least one display driver integrated circuit (IC). In some examples, display driver circuit 124 may include timing controller (TCON) circuitry that receives commands and/or imaging data and generates horizontal and vertical timing signals for thin-film-transistors (TFTs) of a TFT array of display screen 118. Display driver circuit 124 may, for example, be mounted on an edge of a TFT substrate of display screen 118 and electrically connected to scan lines and data lines of a TFT subpixel array.

In at least one embodiment, computing device 126 of display system 120 may communicate with display driver circuit 124 of head-mounted-display device 102. For example, computing device 126 may send image data (video data, still image data, etc.) to display driver circuit 124. Such image data may be utilized by display driver circuit 124 to generate signals that are transmitted to left-eye display region 122A and right-eye display region 122B to generate corresponding images in left-eye display region 122A and right-eye display region 122B. Computing device 126 may communicate with display driver circuit 124 via any suitable wired and/or a wireless connection (e.g., WiFi communications, BLUETOOTH communications, cellular communications, mobile satellite communications, etc.).

Computing device 126 may also include a graphics processing unit (GPU) 128 and image data 130. According to some embodiments, GPU 128 may process and/or manipulate image data 130 that is stored on computing device 126 prior to sending image data to display driver circuit 124 of head-mounted-display device 102. For example, as will be described in greater detail below, GPU 128 may modify initial image data 132 stored on computing device 126 to generate modified image data 134 configured to properly orient and display the corresponding images in left-eye display region 122A and right-eye display region 122B of display screen 118.

Figure 4A:
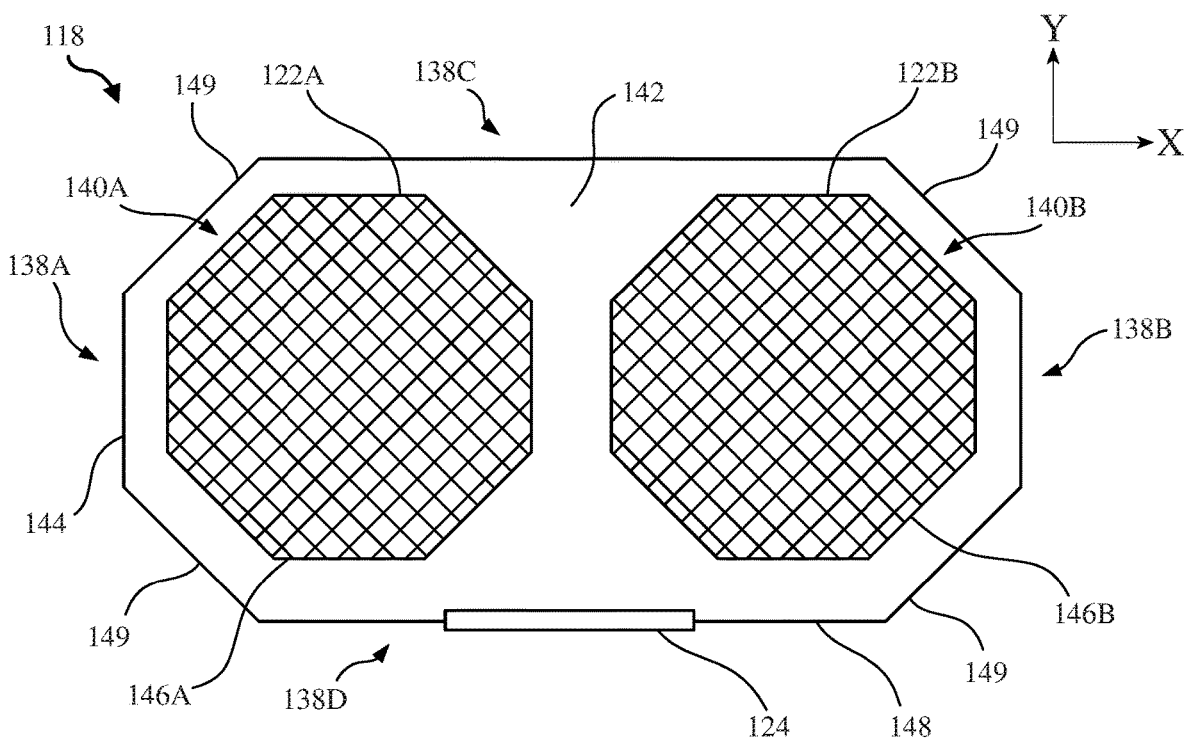
FIG. 4A is a front view of an exemplary display screen in accordance with some embodiments.

FIG. 4A shows a front view of an exemplary display screen 118 that may be included in a display device, such as head-mounted-display device 102 shown in FIGS. 1-3. As shown in this figure, display screen 118 may include left-eye display region 122A and right eye display region 122B that are visible to a user's left and right eyes. Left-eye display region 122A and right-eye display region 122B may respectively include display circuitry 140A and display circuitry 140B for producing images in left- and right-eye display regions 122A and 122B. Display circuitry 140A and display circuitry 140B may each include a TFT array and a plurality of scanning lines and data lines for driving subpixels of left- and right-eye display regions in accordance with scanning and data signals from display driver circuit 124.

Left- and right-eye display regions 122A and 122B may each include a plurality of pixels and subpixels that form visible images according to any suitable display technology. For example, left- and right-eye display regions 122A and 122B may include image pixels formed of LEDs, OLEDs, plasma cells, electrophoretic display elements, LCD components, electrowetting display elements, cathode ray tube (CRT elements), and/or any other suitable image pixel technology. Light from the pixels may be emitted from a front surface 142 of display screen 118 such that images formed by the pixels are visible to a user viewing front surface 142.

Figure 4B:
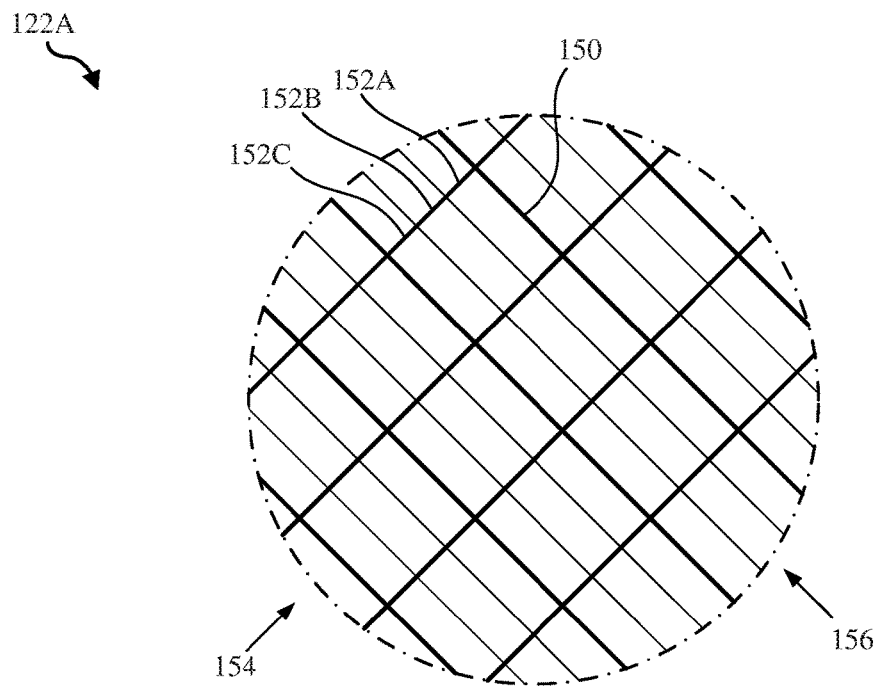
FIG. 4B is a close-up view of a portion of the display screen of FIG. 4A showing pixel detail in accordance with some embodiments.

FIG. 4B shows a close-up view of a portion of left-eye display region 122A of display screen 118. While FIG. 4B illustrate a portion of left-eye display region 122A, right-eye display region 122B may have an array of pixels and subpixels that is similar to that shown in FIG. 4B. As shown in this figure, left-eye display region 122A may include a plurality of pixels 150. Each pixel 150 may include a plurality of subpixels. For example, as shown in FIG. 4B, each pixel 150 may include a first subpixel 152A, second subpixel 152B, and a third subpixel 152C. First subpixel 152A, second subpixel 152B, and third subpixel 152C of each pixel 150 may be individually driven by display circuitry 140A to form an image that is visible to the human eye. Each of first subpixel 152A, second subpixel 152B, and a third subpixel 152C may emit light having a separate wavelength and/or range of wavelengths. For example, each first subpixel 152A may emit light having a first wavelength and/or range of wavelengths (e.g., red light), each second subpixel 152B may emit light having a second wavelength and/or range of wavelengths (e.g., green light), and each third subpixel 152C may emit light having a third wavelength and/or range of wavelengths (e.g., blue light). Additionally or alternatively, pixels 150 may include subpixels that emit any other suitable visible light colors, including, for example, cyan and/or magenta light. In some examples, each pixel 150 may include one or more additional subpixels that emit one or more colors corresponding to those emitted by first subpixel 152A, second subpixel 152B, and/or third subpixel 152C and/or other colors and/or ranges of colors. Although first subpixel 152A, second subpixel 152B, and third subpixel 152C are illustrated in FIG. 4B as having rectangular or generally rectangular peripheries, left-eye display region 122A and right-eye display region 122B of display screen 118 may include subpixels and corresponding pixels having any other suitable shape and configuration, without limitation.

As shown in FIG. 4B, pixels 150 may be arranged in a plurality of pixel rows 154 and a plurality of pixel columns 156. Pixel rows 154 and pixel columns 156 may extend in directions that are nonparallel to sides (e.g., left side 138A, right side 138B, upper side 138C, and lower side 138D) of display screen 118 that extend parallel or substantially parallel to the X- and Y-axes shown in FIG. 4A. In some examples, images may be produced by driving first subpixels 152A, second subpixels 152B, and third subpixels 152C of pixels 150 at different currents and/or voltages such that various amounts of light are emitted from each first subpixel 152A, second subpixel 152B, and a third subpixel 152C. Different visible colors may be produced by combining selected amounts of emitted light from adjacent subpixels of different colors (e.g., red, green, and/or blue subpixels) such that a user perceives pixel colors corresponding to the combinations of subpixels.

Display screen 118 may have any suitable shape and size, without limitation. In at least one embodiment, as shown in FIG. 4A, display screen 118 may have a nonrectangular shape and/or periphery. For example, display screen 118 may have a peripheral surface 144 surrounding front surface 142, left-eye display region 122A, and right-eye display region 122B. Peripheral surface 144 may form an octagonal periphery of display screen 118 that peripherally surrounds and/or abuts front surface 142. In some embodiments, left-eye display region 122A and/or right-eye display region 122B may also include an octagonal periphery. In various examples, display screen 118 may extend longitudinally between a left side 138A and a right side 138B, with left-eye display region 122A and right-eye display region 122B arranged apart from each other in the longitudinal direction parallel to the X-axis shown in FIG. 4A. Peripheral surface 144 of display screen 118 may include one or more canted sides 149 extending obliquely between various side surface portions of peripheral surface 144. For example, canted sides 149 may extend between left side 138A and each of upper side 138C and lower side 138D of display screen 118. Additionally or alternatively, canted sides 149 may extend between right side 138B and each of upper side 138C and lower side 138D of display screen 118. In some embodiments, left-eye display region 122A and/or right-eye display region 122B may also include a nonrectangular periphery. For example, perimeter 146A of left-eye display region 122A and perimeter 146B of right-eye display region 122B may each have an octagonal perimeter that includes portions that extend parallel or substantially parallel to various sides of display screen 118 (e.g., left side 138A, right side 138B, upper side 138C, lower side 138D, and/or one or more canted sides 149).

According to at least one embodiment, display driver circuit 124 may be disposed adjacent to a peripheral edge of display screen 118 that is formed between a portion front surface 142 and peripheral surface 144. For example, as shown in FIG. 4A, display driver circuit 124 may be disposed adjacent to a lower peripheral edge 148 of front surface 142, which is formed between front surface 142 and lower side 138D of peripheral surface 144. Display driver circuit 124 may extend longitudinally along lower peripheral edge 148 in a direction parallel to the X-axis shown in FIG. 4A such that display driver circuit 124 is disposed near each of left-eye display region 122A and right-eye display region 122B in a direction generally parallel to the Y-axis. Accordingly, display driver circuit 124 may extend near each of left-eye display region 122A and right-eye display region 122B as well as near a non-display region located between left-eye display region 122A and right-eye display region 122B. In some embodiments, the plurality of pixel rows 154 and the plurality of pixel columns 156 of left-eye display region 122A and right-eye display region 122B may each extend obliquely relative to lower peripheral edge 148 of front surface 142.

Figure 5A:
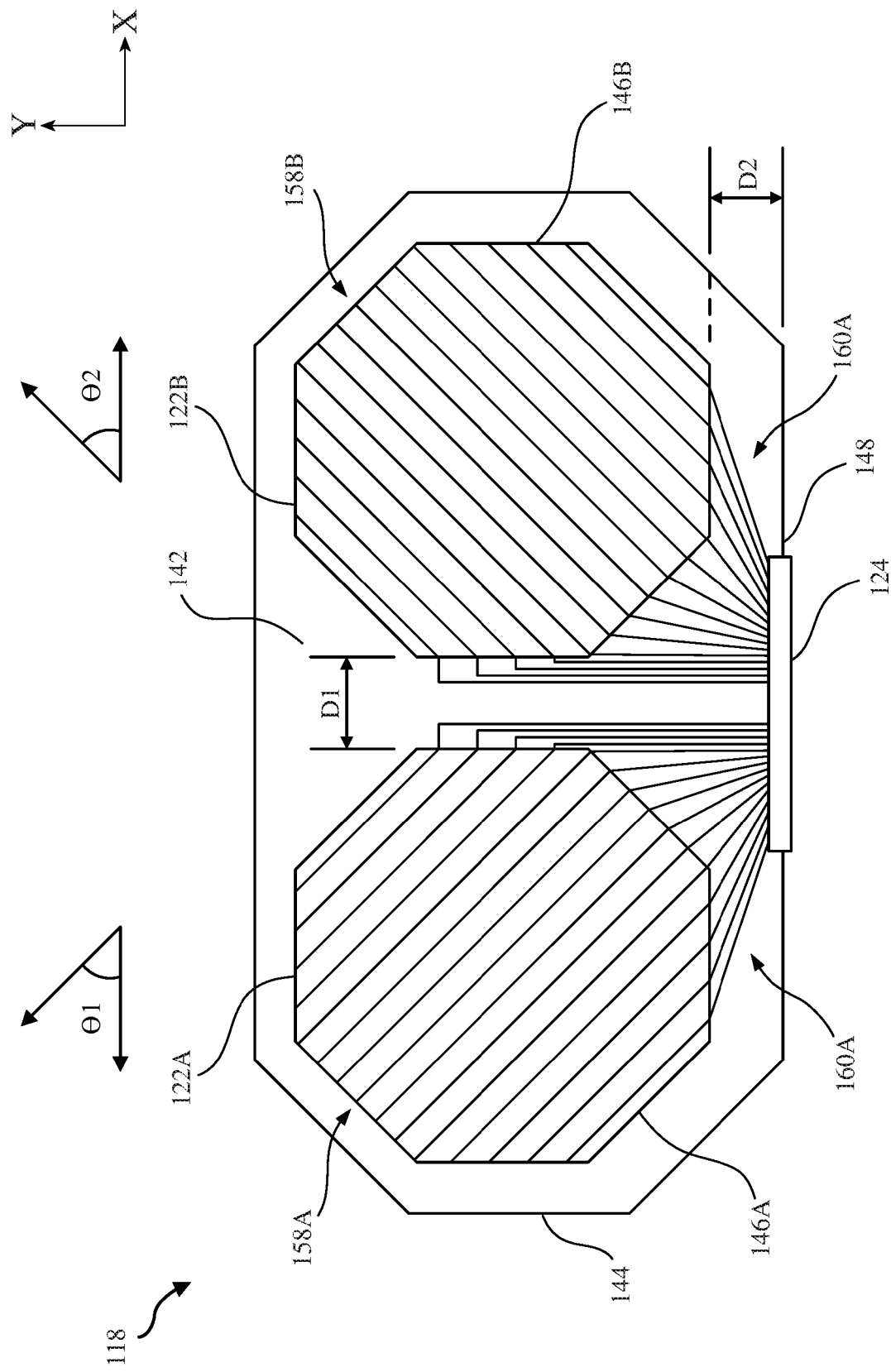
FIG. 5A is a front view of the display screen of FIG. 4A showing details of data lines and corresponding circuitry in accordance with some embodiments.
Figure 5B:
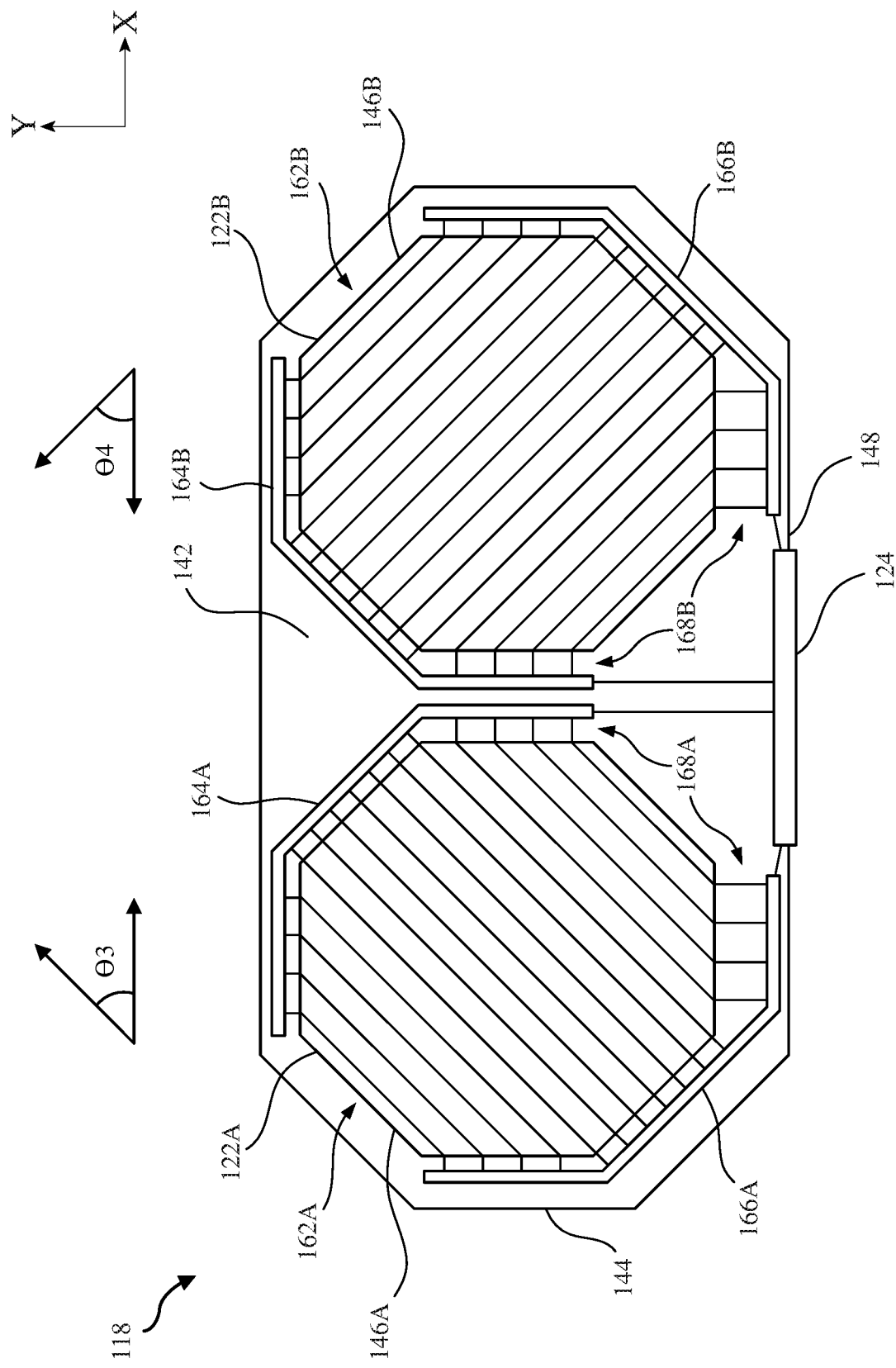
FIG. 5B is a front view of the display screen of FIG. 4A showing details of scanning lines and corresponding circuitry in accordance with some embodiments.

FIGS. 5A and 5B show front views of display screen 118 with various components of display screen 118 visible in each of FIGS. 5A and 5B. FIG. 5A illustrates data line circuitry included in display screen 118 and FIG. 5B illustrates corresponding scanning line circuitry included in display screen 118.

According to some embodiments, as shown in FIG. 5A, left-eye display region 122A may include a plurality of data lines 158A and right-eye display region 122B may include a plurality of data lines 158B. Data lines 158A and data lines 158B may each extend parallel to corresponding pixel columns (e.g., pixel columns 156 shown in FIG. 4B) of left-eye display region 122A and right-eye display region 122B, respectively. Data lines 158A and data lines 158B may extend obliquely relative to sides (e.g., left side 138A, right side 138B, upper side 138C, and lower side 138D) of display screen 118 that are parallel to the X- and Y-axes shown in FIG. 5A. In some examples, data lines 158A and data lines 158B may each extend obliquely relative to lower peripheral edge 148 of front surface 142, which is parallel to the X-axis. For example, data lines 158A may each extend at an angle $\theta_1$ from the X-axis and data lines 158B may each extend at an angle $\theta_2$ from the X-axis. Angle $\theta_1$ and angle $\theta_2$ may each be any suitable angles greater than 0°. For example, angle $\theta_1$ and angle $\theta_2$ may each be 45° or approximately 45°. In at least one embodiment, data lines 158A of left-eye display region 122A may extend in a different direction than data lines 158B of right-eye display region 122B. For example, data lines 158A may each extend at a 90° angle or approximately a 90° angle relative to data lines 158B.

Data lines 158A of left-eye display region 122A may be electrically coupled to display driver circuit 124 via corresponding connecting lines 160A. Additionally, data lines 158B of right-eye display region 122B may be electrically coupled to display driver circuit 124 via corresponding connecting lines 160B. Connecting lines 160A and connecting lines 160B may respectively extend between display driver circuit 124 and terminal ends of data lines 158A and data lines 158B located at portions of perimeter 146A and perimeter 146B of left-eye display region 122A and right-eye display region 122B, respectively. Accordingly, display driver circuit 124 may send driving signals to data lines 158A and data lines 158B via connecting lines 160A and connecting lines 160B, respectively. Connecting lines 160A and connecting lines 160B may be disposed in various non-display regions of display screen 118. For example, some of connecting lines 160A and connecting lines 160B may be disposed in a non-display region of display screen 118 located between left-eye display region 122A and right-eye display region 122B. Left-eye display region 122A and right-eye display region 122B may be positioned apart from one another by a distance D1 in the longitudinal direction of display screen 118 parallel to the X-axis. Distance D1 may provide a margin between left-eye display region 122A and right-eye display region 122B that is sufficient to fit connecting lines 160A and connecting lines 160B extending to corresponding portions of left-eye display region 122A and right-eye display region 122B. Additionally, the distance D1 may provide sufficient space to accommodate at least a portion of at least one gate circuit, as will be described in greater detail in reference to FIG. 5B.

In at least one embodiment, some of connecting lines 160A may be disposed in a non-display region of display screen 118 located between left-eye display region 122A and lower peripheral edge 148 of front surface 142. Additionally, some of connecting lines 160B may be disposed in a non-display region of display screen 118 located between right-eye display region 122B and lower peripheral edge 148. Left-eye display region 122A and right-eye display region 122B may each be positioned apart from lower peripheral edge 148 of front surface 142 by a distance D2 in a direction parallel to the Y-axis. Distance D2 may provide a margin between lower peripheral edge 148 and each of left-eye display region 122A and right-eye display region 122B that is sufficient to accomodate connecting lines 160A and connecting lines 160B extending to corresponding portions of left-eye display region 122A and right-eye display region 122B. Additionally, the distance D2 may provide sufficient space to accommodate at least a portion of at least one gate circuit, as will be described in greater detail in reference to FIG. 5B.

The orientations of data lines 158A and data lines 158B shown in FIG. 5A may allow for a margin between lower peripheral edge 148 and each of left-eye display region 122A and right-eye display region 122B to be reduced in comparison to other data line orientations, such as orientations in which the data lines each extend parallel to the Y-axis, since fewer connecting lines 160A and connecting lines 160B extend between lower peripheral edge 148 and a lower perimeter portion of each of left-eye display region 122A and right-eye display region 122B. Accordingly, a peripheral size of display screen 118 may be reduced by such a configuration, allowing for display screen 118 to be utilized in, for example, headsets have been a reduced form factor. Additionally, orientations of data lines 158A and data lines 158B shown in FIG. 5A may allow for a driving or loading gap between first and last data lines of each of left-eye display region 122A and right-eye display region 122B to be reduced in comparison to other data line orientations due to the relatively close proximity of display driver circuit 124 to each of the terminal connection portions of data lines 158A and data lines 158B. For example, the terminal connection portions may disposed on perimeter sides of left-eye display region 122A and right-eye display region 122B that are angled toward or generally toward display driver circuit 124 as shown in FIG. 5A. Accordingly, driving uniformity of left-eye display region 122A and right-eye display region 122B may be improved due to the reduced driving gaps without requiring the use of an additional display driver circuit.

FIG. 5B shows scanning line circuitry included in display screen 118 (data line circuitry illustrated in FIG. 5A is not shown in FIG. 5B). As illustrated in FIG. 5B, left-eye display region 122A may include a plurality of scanning lines 162A and right-eye display region 122B may include a plurality of scanning lines 162B. Scanning lines 162A and scanning lines 162B each extend parallel to corresponding pixel rows (e.g., pixel rows 154 shown in FIG. 4B) of left-eye display region 122A and right-eye display region 122B, respectively. Scanning lines 162A and scanning lines 162B may extend obliquely relative to sides (e.g., left side 138A, right side 138B, upper side 138C, and lower side 138D) of display screen 118 that are parallel to the X- and Y-axes shown in FIG. 5B. In some examples, scanning lines 162A and scanning lines 162B may each extend obliquely relative to lower peripheral edge 148 of front surface 142, which is parallel to the X-axis. For example, scanning lines 162A may each extend at an angle θ3 from the X-axis and scanning lines 162B may each extend at an angle θ4 from the X-axis. Angle θ3 and angle θ4 may each be any suitable angles greater than 0°. For example, angle θ3 and angle θ4 may each be 45° or approximately 45°. In at least one embodiment, scanning lines 162A of left-eye display region 122A may extend in a different direction than scanning lines 162B of right-eye display region 122B. For example, scanning lines 162A may each extend at a 90° angle or approximately a 90° angle relative to scanning lines 162B. Further, scanning lines 162A may each extend at a 90° angle or approximately a 90° angle relative data lines 158A shown in FIG. 5A and scanning lines 162B may each extend at a 90° angle or approximately a 90° angle relative data lines 158B.

Scanning lines 162A of left-eye display region 122A may each be electrically coupled to display driver circuit 124 via a corresponding upper gate circuit 164A or lower gate circuit 166A and a corresponding connecting line 168A. Additionally, scanning lines 162B of right-eye display region 122B may each be electrically coupled to display driver circuit 124 via a corresponding upper gate circuit 164B or lower gate circuit 166B and a corresponding connecting line 168B. Connecting lines 168A and connecting lines 168B may respectively extend between the gate circuits (upper gate circuits 164A and 164B and lower gate circuits 166A and 166B) and terminal ends of scanning lines 162A and scanning lines 162B at portions of perimeter 146A and perimeter 146B of left-eye display region 122A and right-eye display region 122B, respectively. Accordingly, display driver circuit 124 may send scan signals to scanning lines 162A and scanning lines 162B via the gate circuits and connecting lines 168A and connecting lines 168B, respectively. Connecting lines 168A and 168B, upper gate circuits 164A and 164B, and lower gate circuits 166A and 166B may be disposed in various non-display regions of display screen 118 surrounding left-eye display region 122A and right-eye display region 122B. In some embodiments, upper gate circuits 164A and 164B and lower gate circuits 166A and 166B may be arranged so as to not overlap connecting lines 160A and connecting lines 160B (see FIG. 5A). In some examples, upper gate circuits 164A and 164B and lower gate circuits 166A and 166B may have a narrow width allowing for margins surrounding left-eye display region 122A and right-eye display region 122B between a periphery of front surface 142 and each of left-eye display region 122A and right-eye display region 122B to be minimized. Accordingly, a peripheral size of display screen 118 may be reduced by such a configuration.

Figure 6A:
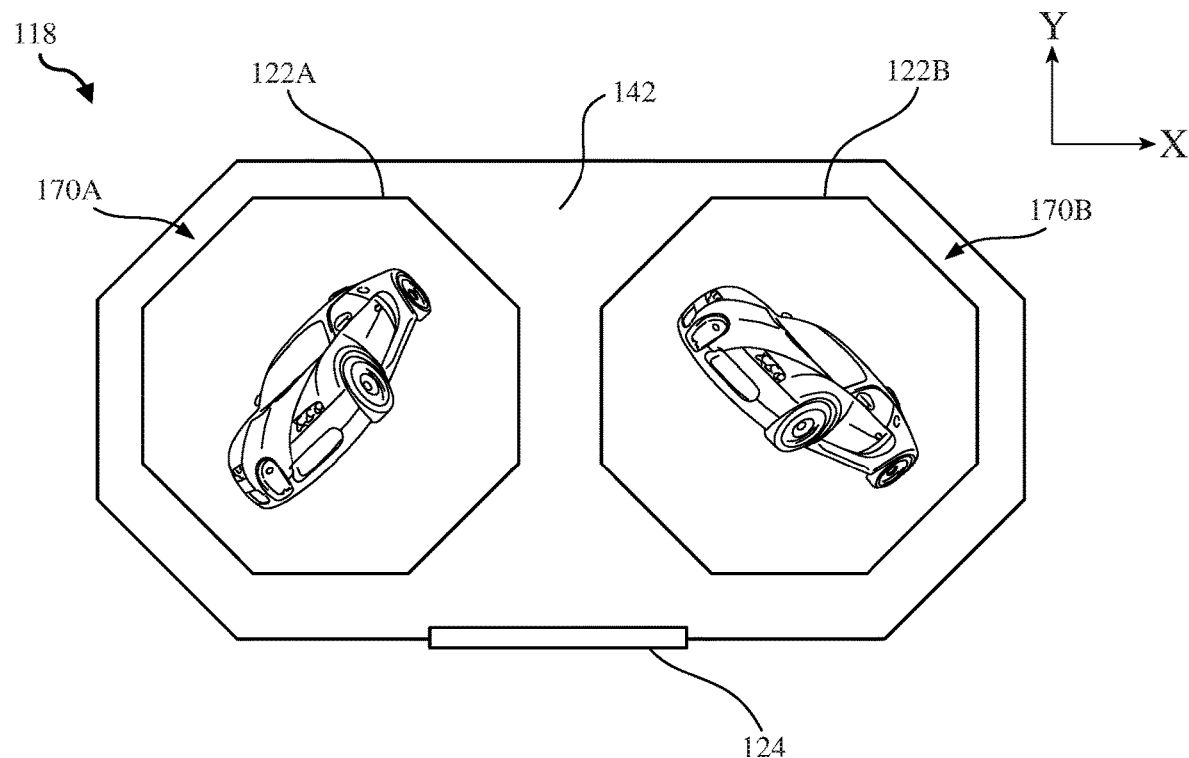
FIG. 6A is a front view of an exemplary display screen displaying images in accordance with some embodiments.
Figure 6B:
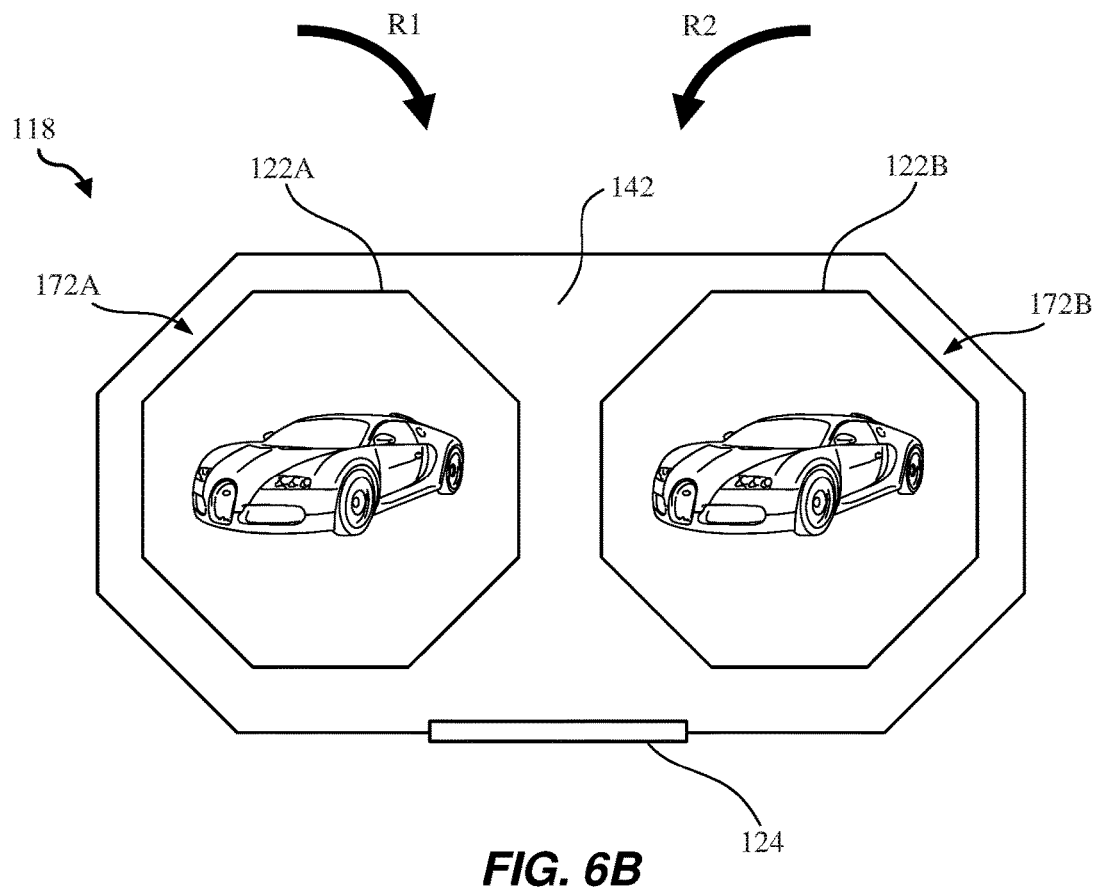
FIG. 6B is a front view of the display screen of FIG. 6A in accordance with some embodiments.

FIGS. 6A and 6B illustrate rotation of image data to produce images on display screen 118 that are in a desired orientation. As shown in FIG. 6A, images that are generated based on image data configured for display on conventional display screens may appear rotated in left-eye display region 122A and right-eye display region 122B of display screen 118 if the image data is displayed without modification. This is because such conventional image data may be configured for display on display screens having pixels arranged in horizontal rows and vertical columns that extend, for example, parallel to rectangular sides of the display screens. However, as described above, left-eye display region 122A and right-eye display region 122B of display screen 118 may include pixels that are arranged along pixel rows and pixel columns (see, e.g., pixel rows 154 and pixel columns 156 of FIG. 4B) that extend in directions that are nonparallel to horizontal and vertical sides of the display screens. For example, pixel rows and pixel columns of left-eye display region 122A and right-eye display region 122B may be respectively arranged parallel to scanning lines 162A and scanning lines 162B and data lines 158A and data lines 158B such that the pixel rows and pixel columns each extend at an angle of 45° with respect to the horizontal and vertical directions. Accordingly, as shown in FIG. 6A, unmodified left-eye image 170A and unmodified right-eye image 170B generated based on unmodified conventional image data would each appear a user to be tilted at angles of 45° with respect to the horizontal and vertical directions represented by the X- and Y-axes. Additionally, unmodified left-eye image 170A and unmodified right-eye image 170B would appear to be angled with respect to each other by an angle of 90°.

In order to properly orient and display images in left-eye display region 122A and right-eye display region 122B, image data (e.g., initial image data 132) that is configured for displaying images on conventional displays may be modified by, for example, by GPU 128 to generate modified image data 134 (See, e.g., FIG. 3). GPU 128 may be configured to, for example, generate modified image data 134 that results in images being displayed in left-eye display region 122A and right-eye display region 122B of display screen 118 in their proper orientations. For example, as shown in FIG. 6B, supplying display driver circuit 124 with modified image data 134 may result in the orientations of modified left-eye image 172A and modified right-eye image 172B appearing respectively rotated by angles of rotation of 45° relative to the orientations of unmodified left-eye image 170A and unmodified right-eye image 170B generated based on unmodified conventional image data, as shown in FIG. 6A. For example, modified left-eye image 172A may be rotated 45° clockwise in rotational direction R1 with respect to unmodified left-eye image 170A. Additionally, modified right-eye image 172B may be rotated 45° counterclockwise in rotational direction R2 with respect to unmodified right-eye image 170B.

Figure 7:
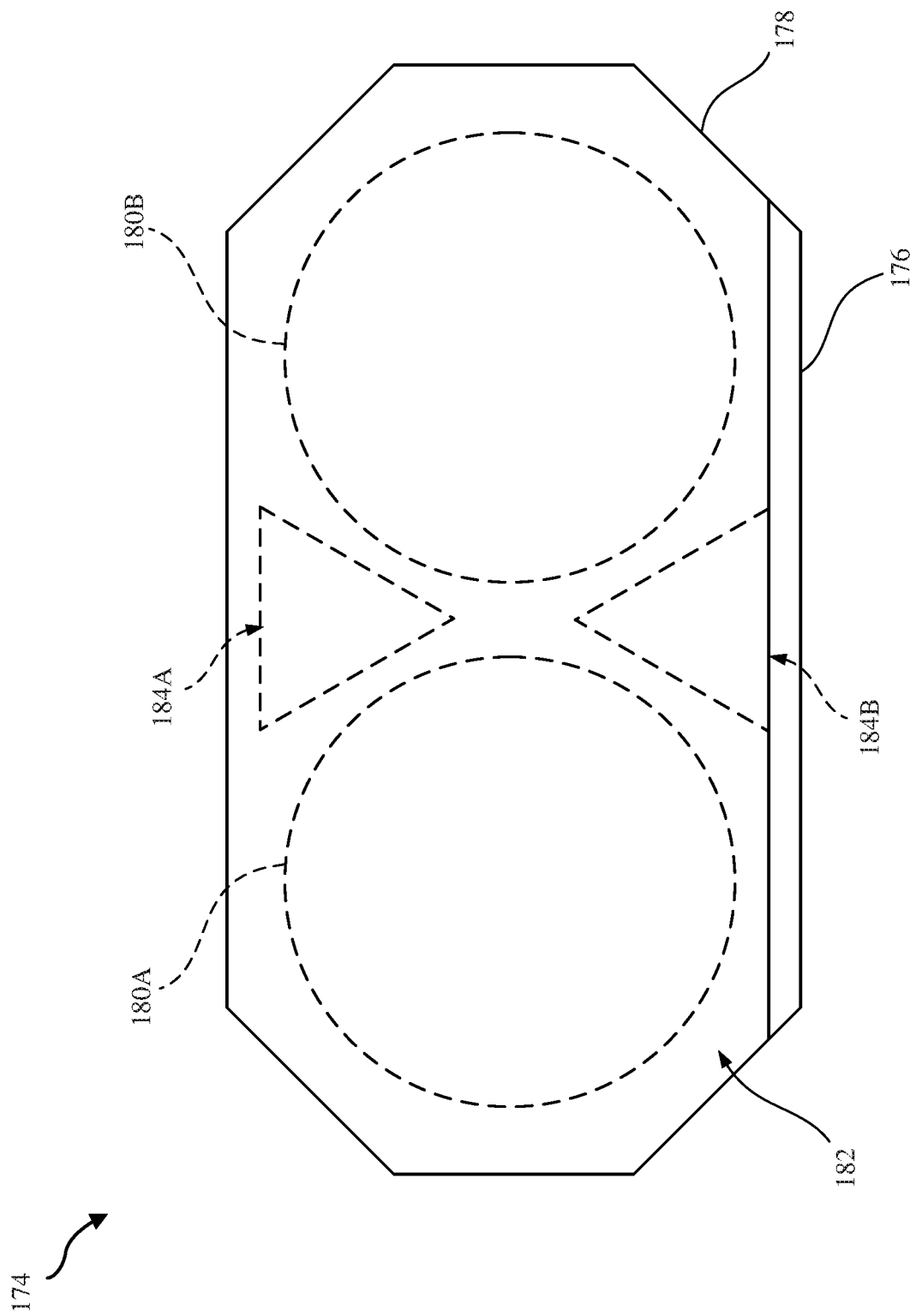
FIG. 7 is a front view of an exemplary backlight unit in accordance with some embodiments.

FIG. 7 shows an exemplary backlight unit 174 of a display screen, such as display screen 118 shown in, for example, FIGS. 4A-6B. Backlight unit 174 may include any suitable type of light source that emits light through pixels and subpixels of a liquid crystal display screen. For example, backlight unit 174 may include an array of light-emitting diodes, an electroluminescent panel, a cold cathode fluorescent lamp, a hot cathode fluorescent lamp, an external electrode fluorescent lamp, and/or an array of laser emitting diodes, without limitation. According to some embodiments, backlight unit 174 may include a light source 176 (e.g., an LED array) that generates light for display screen 118. Additionally, backlight unit 174 may include a light guide plate 178 that diffuses and redirects light from light source 176 toward light modulating portions of display screen 118. In at least one embodiment, an outer periphery of backlight unit 174 may have a shape corresponding to a shape of peripheral surface 144 of display screen 118. For example, backlight unit 174 may have a non-rectangular shape, such as an octagonal shape as shown in FIG. 7.

In some embodiments, backlight unit 174 may include a left-eye lighting region 180A and a right-eye lighting region 180B that respectively correspond to and overlap left- and right-eye display regions 122A and 122B of display screen 118 (see, e.g., FIGS. 3-6B). Left-eye lighting region 180A and right-eye lighting region 180B may be configured to respectively emit light through left-eye display region 122A and right-eye display region 122B of display screen 118. Left-eye lighting region 180A and right-eye lighting region 180B may each be surrounded by a non-display region 182. According to at least one embodiment, at least a portion of light emitted from regions of non-display region 182 adjacent to and/or surrounding each of left-eye lighting region 180A and right-eye lighting region 180B may also pass through left- and right-eye display regions 122A and 122B of display screen 118. Additionally, one or more portions of non-display region 182 may emit light that does not substantially pass through left-eye display region 122A and right-eye display region 122B such that light emitted from such portions may essentially be wasted. In some embodiments, such light wasting portions of backlight unit 174 may be at least partially eliminated by reducing the peripheral size of backlight unit 174 surrounding left-eye lighting region 180A and right-eye lighting region 180B. For example, corner regions of a conventional rectangular backlight unit, which might not be disposed in close proximity to left-eye lighting region 180A and right-eye lighting region 180B, might be eliminated with the octagonal periphery of backlight unit 174, which includes canted regions (see, e.g., canted sides 149 shown in FIG. 4A) are disposed in relatively closer proximity to left-eye lighting region 180A and right-eye lighting region 180B.

According to at least one embodiment, light guide plate 178 may include microstructures, such as a pattern of microstructures, for diffusing light from light source 176. Microstructures may include, for example, any suitable protrusions, grooves, ridges, and/or other features formed in any suitable shapes and patterns in light guide plate 178. Such microstructures may diffuse light by changing directions of incident light to reflect and/or refract such light from light guide plate 178 toward pixel regions of a light modulating portion of a display screen (e.g., display screen 118 of FIGS. 2A-6B). In some examples, the microstructures may include a plurality of diffuser dots, such as a pattern of diffuser dots formed in light guide plate 178 as will be described in greater detail below.

In various embodiment, light guide plate 178 may include at least one low-density microstructure region in a portion of light guide plate 178. For example, as shown in FIG. 7, light guide plate 178 may include a first low-density microstructure region 184A and a second low-density microstructure region 184B formed in portions of non-display region 182 of light guide plate 178. As shown, for example, first and second low-density microstructure regions 184A and 184B may be located in regions between left-eye lighting region 180A and right-eye lighting region 180B. First and second low-density microstructure regions 184A and 184B may each have any suitable shape and size, such as, for example, a triangular or substantially triangular shape, a tapered shape, and/or any other suitable shape. First and second low-density microstructure regions 184A and 184B may each include a density of the microstructures that is lower than a density of microstructures in left-eye lighting region 180A, right-eye lighting region 180B, and portions of non-display region 182 outside of first and second low-density microstructure regions 184A and 184B. In some examples, first low-density microstructure region 184A and/or second low-density microstructure region 184B may be free or substantially free of microstructures. Accordingly, light may be inhibited or prevented from being emitted from first and second low-density microstructure regions 184A and 184B such that an amount light emitted from first and second low-density microstructure regions 184A and 184B may be reduced considerably in comparison to other portions of light guide plate 178 that include greater densities of microstructures.

Figure 8A:
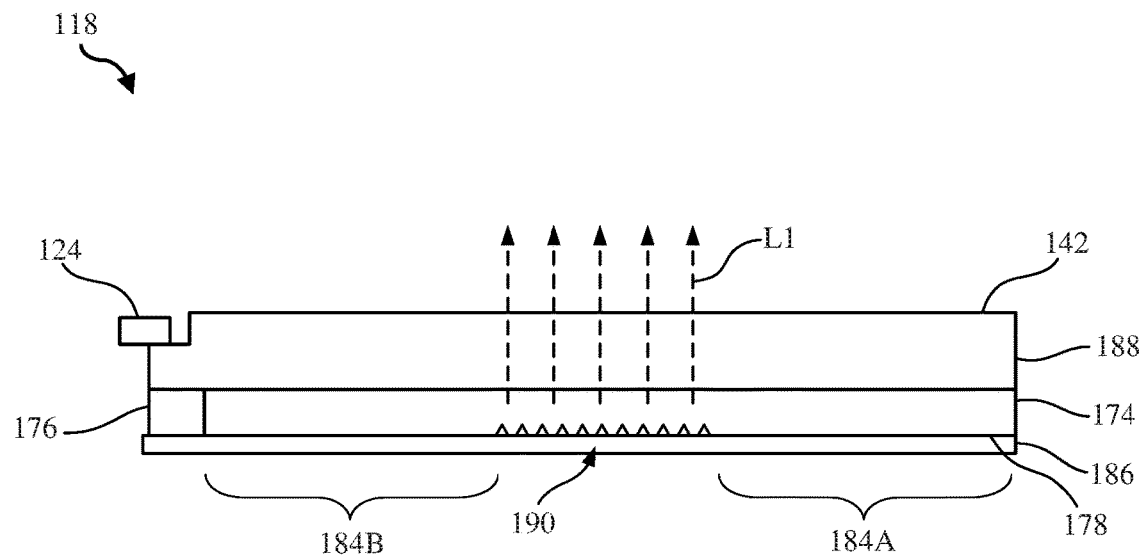
FIG. 8A is a cross-sectional side view of an exemplary display screen in accordance with some embodiments.
Figure 8B:
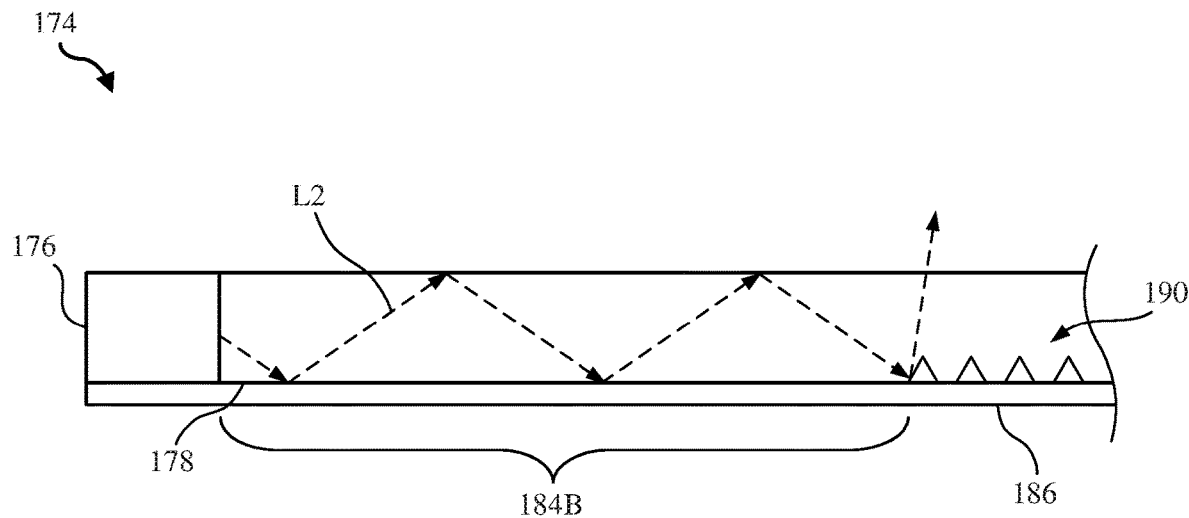
FIG. 8B is a cross-sectional side view of a portion of a backlight unit of the display screen in FIG. 8A in accordance with some embodiments.

FIG. 8A shows a cross-sectional side view a display screen 118 including backlight unit 174 and FIG. 8B shows a cross-sectional side view of a portion of backlight unit 174 in accordance with some embodiments. In some embodiments, backlight unit 174 may additionally include features for directing light from light source 176 as light L1 directed toward pixel forming portions of display screen 118. Light L1 may, for example, pass through an imaging assembly 188 of display screen 118 and may be emitted from front surface 142 of display screen 118 as image light that is visible to a user. As illustrated in FIG. 8A, display screen 118 may include imaging assembly 188 and a rear cover 186 respectively disposed on front and back sides of backlight unit 174. Imaging assembly 188 may include, for example, a liquid crystal element layer and a TFT array substrate. Display circuitry 140A and 140B of left-eye display region 122A and right-eye display region 122B, including data lines 158A and 158B and scanning lines 162A and 162B, may be included in imaging assembly 188 (see, e.g., FIGS. 4A-5B). Display driver circuit 124 may be disposed on and/or may be electrically coupled to imaging assembly 188. In at least one example, light source 176 may be disposed at and/or adjacent to lower side 138D of display screen 118 adjoining lower peripheral edge 148 of front surface 142 (see, e.g., FIG. 4A) such that display driver circuit 124 at least partially overlaps and/or extends parallel to light source 176.

According to at least one embodiment, rear cover 186 may include a material, such as a reflective metal material and/or any other suitable reflective material, that reflects light L2 emitted from light source 176 within backlight unit 174, as shown in FIG. 8B. Additionally, a surface of backlight unit 174 facing imaging assembly 188 and/or a material disposed adjacent to the surface of backlight unit 174 facing imaging assembly 188, may reflect at least a portion of light L2 emitted from backlight unit 174, such as portions of light L2 that that are incident to the surface at angles below a certain threshold angle of incidence. Accordingly, light L2 emitted from light source 176 may be reflected within backlight unit 174 between front and rear surfaces of light guide plate 178, as illustrated in FIG. 8B.

As shown in FIGS. 8A and 8B, light guide plate 178 may also include a plurality of microstructures 190, such as a plurality of diffuser dots protruding into light guide plate 178 from a rear surface of light guide plate 178 adjacent rear cover 186. In some embodiments, microstructures 190 may have surfaces that are selectively angled and positioned to reflect incident light L2 toward imaging assembly 188. In at least one example, first low-density microstructure region 184A and second low-density microstructure region 184B of backlight unit 174 may be devoid or substantially devoid of microstructures 190 such that light L2 from light source 176 passes substantially unimpeded through first and second low-density microstructure regions 184A and 184B, as illustrated in FIG. 8B. Light L2 passing through first low-density microstructure region 184A may then, for example, be reflected toward imaging assembly 188 by a surface portion of a microstructure 190. Light L2 reflected by microstructures 190 may be incident on a front surface of light guide plate 178 at an angle greater than a threshold angle of incidence such that the reflected light passes through the front surface of light guide plate 178 as shown in FIG. 8B.

Because little or no light from light source 176 is emitted from light guide plate 178 at first and second low-density microstructure regions 184A and 184B, backlight unit 174 may allow for a greater quantity of light from light source 176 to reach left- and right-eye lighting regions 180A and 180B and portions of non-display region 182 closely surrounding left- and right-eye lighting regions 180A and 180B (see FIG. 7). Accordingly, a greater amount of light may be emitted from backlight unit 174 in left- and right-eye lighting regions 180A and 180B in comparison to a display that does not include such low-density microstructure regions. As such, backlight unit 174 may provide greater luminance uniformity in display regions of display screen 118 (e.g., left- and right-eye display regions 122A and 122B of FIGS. 3-5B) and/or may require a lower quantity of light to be emitted by light source 176 to achieve a desired luminance uniformity and/or brightness.

Figure 9:
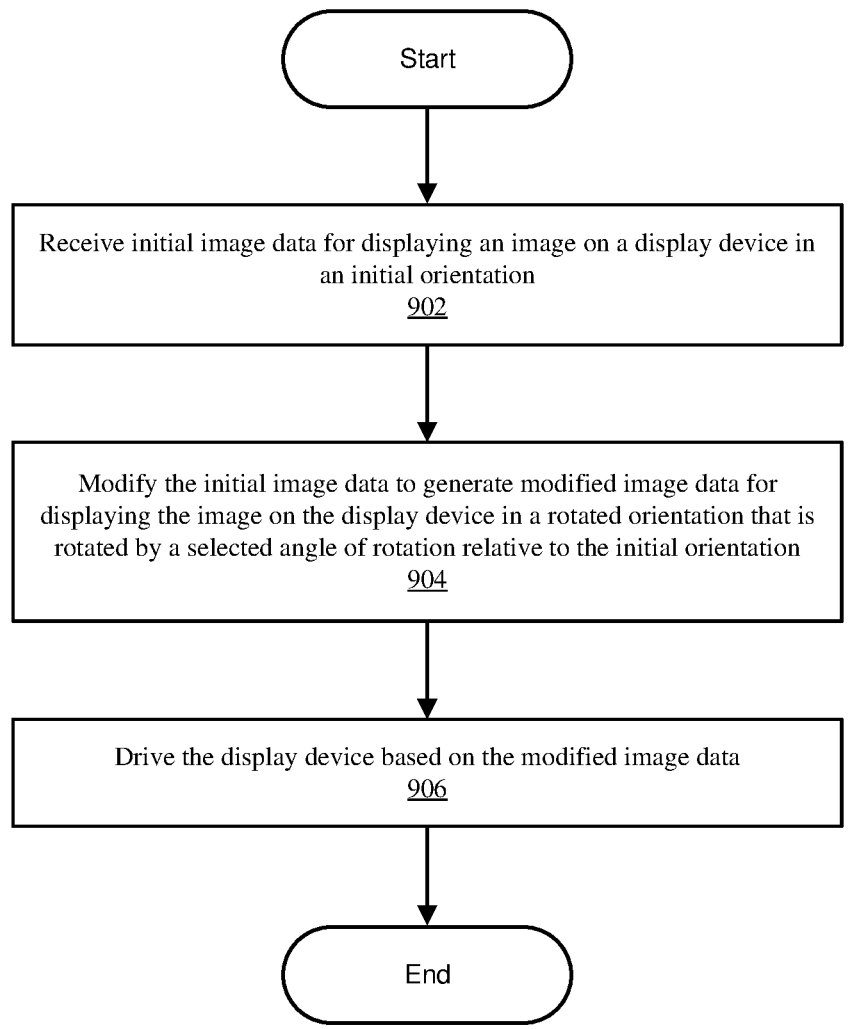
FIG. 9 is a flow diagram of an exemplary method for displaying an image in a display screen in accordance with some embodiments.

FIG. 9 is a flow diagram of an exemplary method 900 for displaying an image in a display screen. The steps shown in FIG. 9 may be performed by any suitable computer-executable code and/or computing system, including, for example, display system 120 in FIG. 3. In one example, at least a portion of one or more of the steps shown in FIG. 9 may represent an algorithm whose structure includes and/or is represented by multiple sub-steps, examples of which will be provided in greater detail below.

As illustrated in FIG. 9, at step 902, one or more of the systems and/or devices described herein may receive initial image data for displaying an image on a display device in an initial orientation. For example, GPU 128 of computing device 126 may receive initial image data 132 for displaying an image (e.g., unmodified left-eye image 170A or unmodified right-eye image 170B) on a head-mounted-display device 102 in an initial orientation (see, e.g., FIGS. 3, 6A, and 6B).

At step 904 in FIG. 9, one or more of the systems and/or devices described herein may modify the initial image data to generate modified image data for displaying the image on the display device in a rotated orientation that is rotated by a selected angle of rotation relative to the initial orientation. For example, GPU 128 of computing device 126 may modify initial image data 132 to generate modified image data 134 for displaying the image (e.g., modified left-eye image 172A or modified right-eye image 172B) on head-mounted-display device 102 in a rotated orientation that is rotated by a selected angle of rotation (e.g., approximately 45°) relative to the initial orientation (Id.).

At step 906 in FIG. 9, one or more of the systems and/or devices described herein may drive the display device based on the modified image data. For example, display driver circuit 124 may drive head-mounted-display device 102 based on modified image data 134 (Id.). In this example, the display device may include a display screen having (1) a front surface and (2) at least one display region that emits, from the front surface, image light forming the image. The at least one display region may include a plurality of pixels arranged in a plurality of pixel rows and a plurality of pixel columns, at least one of the plurality of pixel rows or the plurality of pixel columns extending at an extension angle relative to a peripheral edge of the front surface, wherein the extension angle is equivalent to the selected angle of rotation. In this example, head-mounted-display device 102 may include display screen 118 having front surface 142 and left- and right-eye display regions 122A and 122B that each emit, from front surface 142, image light L1 forming the image (see, e.g., FIGS. 3, 6A, 6B, 8A, and 8B). Left- and right-eye display regions 122A and 122B may each include a plurality of pixels 150 arranged in a plurality of pixel rows 154 and a plurality of pixel columns 156, at least one of the plurality of pixel rows or the plurality of pixel columns extending at an extension angle relative to lower peripheral edge 148 of front surface 142, with the extension angle being equivalent to the selected angle of rotation (e.g., approximately 45°) (Id.).

According to some embodiments, receiving the initial image data may further include (1) receiving a first set of initial image data for displaying a first image in the first display region in a first initial orientation and (2) receiving a second set of initial image data for displaying a second image in the second display region in a second initial orientation. For example, GPU 128 of computing device 126 may receive a first set of initial image data 132 for displaying unmodified left-eye image 170A in left-eye display region 122A. Additionally, GPU 128 may receive a second set of initial image data 132 for displaying unmodified right-eye image 170B in right-eye display region 122B (see, e.g., FIGS. 3, 6A, and 6B).

In at least one example, modifying the initial image data may further include (1) modifying the first set of initial image data to generate a first set of modified image data for displaying the first image in the first display region in a first rotated orientation that is rotated by a first selected angle of rotation relative to the first initial orientation and (2) modifying the second set of initial image data to generate a second set of modified image data for displaying the second image in the second display region in a second rotated orientation that is rotated by a second selected angle of rotation relative to the second initial orientation, wherein the second selected angle of rotation is different than the first selected angle of rotation. For example, GPU 128 of computing device 126 may modify the first set of initial image data 132 to generate a first set of modified image data 134 for displaying unmodified left-eye image 170A in left-eye display region 122A in a first rotated orientation that is rotated by a first selected angle of rotation (e.g., approximately 45° in a clockwise direction) relative to the first initial orientation (Id.). Additionally, GPU 128 may modify the second set of initial image data 132 to generate a second set of modified image data 134 for displaying unmodified right-eye image 170B in right-eye display region 122B in a second rotated orientation that is rotated by a second selected angle of rotation (e.g., approximately 45° in a counter clockwise direction) relative to the first initial orientation (Id.).

As discussed throughout the instant disclosure, the disclosed devices, systems, and methods may provide one or more advantages over traditional display devices, systems, and methods. The above-described features may enable display screens, and likewise display devices (e.g., head-mounted displays) including such display screens, to be formed with a smaller profile without sacrificing display performance. In some embodiments, display screens may have a non-rectangular (e.g., octagonal) peripheral shape that accommodates various display components, including a display driver circuit, display circuitry in a pair of left- and right-eye display regions, and a backlight unit.

Data and scanning lines in each of the display regions of the display screens may be arranged to extend obliquely relative to horizontal and vertical sides of the display screens. Such a configuration may provide improved display performance and uniformity by reducing a driving gap between first and last data lines in each of the display regions. Additionally, the angled layout of scanning and data lines may enable margins around portions the display regions to be reduced, providing further reductions in display screen size. Moreover, the disclosed embodiments may allow for two display regions on a single display screen to be effectively driven simultaneously by a single display driver circuit.

The disclosed devices, systems, and methods may also enable images displayed in left- and right-eye display regions of the display screen to be automatically rotated by modifying image data to enable proper display of the images in the display regions. The display screens may also include backlight units having light guide plates that include non-display regions having portions that are devoid of microstructures to enable a greater amount of light to be emitted from left- and right-eye display regions of the display screens. As such, luminance uniformity in the display regions may be improved. Additionally or alternatively, the backlight units may provide a desired display brightness using a lower amount of energy.

As detailed above, the computing devices, display devices, and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A display device comprising:
   a display screen that comprises:
      a front surface; and
      a pair of display regions that emit image light from the front surface, the pair of display regions separated from each other by a non-display region in a longitudinal direction of the display screen, each of the pair of display regions comprising a plurality of pixels arranged in a plurality of pixel rows and a plurality of pixel columns, the plurality of pixel rows and the plurality of pixel columns each extending obliquely relative to a peripheral edge of the front surface;
   a display driver circuit for driving the plurality of pixels of both of the pair of display regions, wherein the display driver circuit is disposed apart from both of the pair of display regions in a lateral direction of the display screen; and
   a plurality of connecting lines coupling the display driver circuit to a plurality of data lines of each of the pair of display regions, wherein at least some of the plurality of connecting lines are located in the non-display region between the pair of display regions.

2. The display device of claim 1, wherein each of the pair of display regions further comprises:
   a plurality of scanning lines extending parallel to the plurality of pixel rows; and
   the plurality of data lines extending parallel to the plurality of pixel columns.

3. The display device of claim 2, wherein the display driver circuit is electrically coupled to the plurality of scanning lines and the plurality of data lines of each of the pair of display regions.

4. The display device of claim 1, wherein:
   a first display region of the pair of display regions comprises a first set of scanning lines;
   a second display region of the pair of display regions comprises a second set of scanning lines; and
   each of the first set of scanning lines extends in a first scanning line direction and each of the second set of scanning lines extends in a second scanning line direction that is different than the first scanning line direction.

5. The display device of claim 4, wherein:
   the display driver circuit is electrically coupled to scanning lines of the first display region via a first gate circuit;
   the display driver circuit is electrically coupled to scanning lines of the second display region via a second gate circuit; and
   at least a portion of each of the first and second gate circuits is located in the non-display region between the pair of display regions.

6. The display device of claim 1, wherein:
   the plurality of pixel rows of each of the pair of display regions each extend in a row direction having an angle of approximately 45° with respect to the peripheral edge of the front surface; and
   the plurality of pixel columns of each of the pair of display regions each extend in a column direction having an angle of approximately 45° with respect to the peripheral edge of the front surface.

7. The display device of claim 1, wherein a perimeter of the plurality of pixels in each of the pair of display regions comprises a nonrectangular shape.

8. The display device of claim 7, wherein the perimeter of the plurality of pixels in each of the pair of display regions comprises an octagonal shape.

9. The display device of claim 7, wherein at least one side of the perimeter of the plurality of pixels in each of the pair of display regions intersects multiple scanning lines and multiple data lines of the plurality of data lines.

10. The display device of claim 1, wherein the display screen comprises a nonrectangular periphery surrounding the front surface.

11. The display device of claim 1, wherein the display screen further comprises a backlight unit comprising:
    a light source; and
    light guide plate comprising a pattern of microstructures for diffusing light from the light source, wherein a density of the microstructures is lower in a non-display region of the display screen.

12. The display device of claim 11, wherein the microstructures of the pattern of microstructures are not formed in the non-display region of the display screen.

13. The display device of claim 11, wherein the pattern of microstructures comprises a plurality of diffuser dots.

14. The display device of claim 11, wherein the non-display region of the display screen is located between the pair of display regions.

15. The display device of claim 11, wherein the light source is disposed adjacent to a peripheral side of the display screen adjoining the peripheral edge of the front surface.

16. The display device of claim 1, wherein the display driver circuit is disposed adjacent to the peripheral edge of the front surface.

17. A head-mounted-display system comprising:
a display screen that comprises:
 a front surface; and
 a pair of display regions that emit image light from the front surface, the pair of display regions separated from each other by a non-display region in a longitudinal direction of the display screen, each of the pair of display regions comprising a plurality of pixels arranged in a plurality of pixel rows and a plurality of pixel columns, the plurality of pixel rows and the plurality of pixel columns each extending obliquely relative to a peripheral edge of the front surface;
a display driver circuit for driving the plurality of pixels of both of the pair of display regions, wherein the display driver circuit is disposed apart from both of the pair of display regions in a lateral direction of the display screen;
a plurality of connecting lines coupling the display driver circuit to a plurality of data lines of each of the pair of display regions, wherein at least some of the plurality of connecting lines are located in the non-display region between the pair of display regions; and
a pair of lenses, wherein each of the pair of display regions is viewable through a separate one of the pair of lenses.

18. The head-mounted-display system of claim 17, further comprising a display housing surrounding the display screen, the display driver circuit, and a viewing region surrounding the pair of lenses.

19. A method comprising:
driving, by a display driver circuit, pixels of a first display region of a display screen, the display screen comprising:
 a front surface; and
 a pair of display regions that emit image light from the front surface, the pair of display regions comprising the first display region and a second display region separated from each other by a non-display region in a longitudinal direction of the display screen, each of the pair of display regions comprising a plurality of pixels arranged in a plurality of pixel rows and a plurality of pixel columns, the plurality of pixel rows and the plurality of pixel columns each extending obliquely relative to a peripheral edge of the front surface; and
driving, by the display driver circuit, pixels of the second display region of the display screen,
wherein:
 the display driver circuit is disposed apart from both of the pair of display regions in a lateral direction of the display screen and the display driver circuit is coupled to a plurality of data lines of each of the pair of display regions by a plurality of connecting lines; and
 at least some of the plurality of connecting lines are located in the non-display region between the pair of display regions.

* * * * *